Jan. 18, 1938.  H. C. HAYES  2,105,479
APPARATUS FOR MEASURING THICKNESS
Filed July 10, 1935
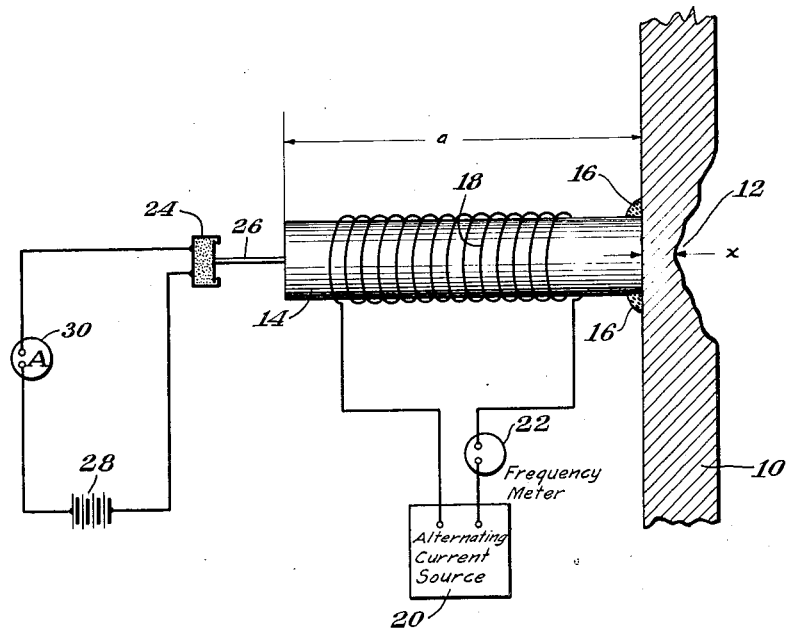
Harvey C. Hayes
INVENTOR
BY
*Robert A. Lavender*
his ATTORNEY Patented Jan. 18, 1938

2,105,479

UNITED STATES PATENT OFFICE 2,105,479

APPARATUS FOR MEASURING THICKNESS

Harvey C. Hayes, Washington, D. C.

Application July 10, 1935, Serial No. 30,750

2 Claims. (Cl. 73—51)

(Granted under the act of March 3, 1883, as amended April 30, 1928; 370 O. G. 757)

This invention relates to the measuring of thickness and more particularly to apparatus for measuring the thickness of a metal plate. The primary object of the invention is to provide apparatus of this type which may be used in determining accurately and easily and entirely from one side, the thickness of a plate such as the wall of a boiler or still.

It is desirable, if not essential, to keep a frequent and accurate check on the thickness of the walls of a liquid containing receptacle such as a boiler or other liquid heater. In the refining and cracking of hydrocarbons the inner surfaces of the stills often become pitted due to corrosion and the wall will thus become thinner either in spots or in its entirety. If the thin spots are not found and the wall repaired an explosion of the still with an attendant disastrous fire may, of course, result.

Several methods have been devised for periodically measuring the thickness at various points in the wall of a liquid heater such as an oil still and the method most commonly used is to drill through the wall at the places where measurements are to be taken and then to measure the thickness of the wall with some suitable calipering device. This method has many disadvantages among the more important being the excessive time consumed both in drilling the numerous holes through the still wall and in the refilling of these holes either by welding in additional material or by suitable plugs. This method frequently necessitates the presence of an operator on the inner side of the still wall as well as one on the outer side and this is naturally not only inconvenient but extremely dangerous due to the presence of harmful vapors in the stills.

In accordance with the present invention, apparatus has been provided which may be used to effect an accurate measurement of the thickness of a metal wall, the entire operation being conducted from only one side of the wall. Thus, with this invention one operator can, in a short time, take measurements at many places in a still wall while remaining at all times on the outside of the still.

In carrying out the invention, a bar or rod of magnetostrictive material is temporarily or permanently attached to the outer surface of the still wall at a place where it is desired to measure the thickness of the wall. This bar is surrounded by a magnet or solenoid coil adapted to be energized from a source of alternating current of variable frequency. The energization of the coil will establish a magnetic field which will cause mechanical distortion or deformation of the bar by magnetostriction. Thus, the bar and that portion of the still wall to which the bar is affixed will vibrate in a direction longitudinally of the bar and at the frequency of the alternating current supplied to the coil. By varying the frequency of the current a point will be found at which the bar and still wall will vibrate at their natural resonant frequency and the thickness of the wall can then be readily determined as will be explained hereinafter. Means for determining when the bar and wall are vibrating at their natural frequency is also provided, this means comprising a microphone mounted on the projecting end of the bar and connected in series with a source of electrical supply and a current measuring device. The resonant condition of the bar may be readily determined by observing the change in the amount of current passing through the microphone circuit.

For a further description of the invention reference may be had to the accompanying drawing, the single figure of which is a partly diagrammatic illustration of the apparatus as applied to the measurement of the thickness of a still wall which has been pitted by corrosion or through some other cause.

Referring to the drawing, the inner surface of a section of a metal wall 10 such as the shell of an oil still is shown as corroded at 12, the corrosion causing a material thinning of the wall. A bar or tube 14 of a suitable magnetostrictive material such as iron, cobalt or nickel, is secured to the outer surface of the wall by any suitable means but preferably by welding as at 16. A coil of wire 18 is shown diagrammatically as surrounding the bar 14 and this coil is connected to a source of alternating current which may comprise a power tube transmitter 20. The frequency of the alternating current from source 20 is variable and can be determined at any time by referring to a frequency meter 22.

The bar 14, being of a magnetostrictive material, has the quality of changing its length under the action of the magnetic field supplied by the coil 18 and as a result, when the coil 18 is energized from the source 20, the bar 14 will alternatingly expand and contract at the frequency of the alternating current but with a comparatively small amplitude of motion. However, by varying the frequency of the electric current so that it becomes equal to the natural resonant frequency of the bar 14 the amplitude of vibration of the bar becomes many times greater than at other frequencies and if the bar were not attached to the wall 10 it would vibrate in its fundamental mode with a node in the center and a loop at each end representing a half wave length of the sound waves generated in that material at the resonant frequency. However, as one end of the bar 14 is securely attached to the wall 10, the combination of the bar and that portion of the wall to which the bar is attached together determine the resonant frequency. When the combination is vibrated at its fundamental frequency the length $(a)$ of the bar 14 plus the thickness $(x)$ of the still wall 10 is equal to a half wave length of the sound waves in the metal of which the bar is formed.

In order to be able to determine more readily when the frequency of the alternating current supplied to the coil 14 is accurately adjusted to cause resonance, means have been provided for indicating when the bar is vibrating at its natural resonant frequency. A microphone 24 is attached as by means of a short rod 26 to the projecting or outer end of the bar 14, the microphone being connected in circuit with a source of electrical supply 28 and a suitable current measuring device such as an ammeter 30. By varying the frequency of the alternating current supplied to the coil 18 and observing the change of current flow in the microphone circuit as indicated by the ammeter 30 it can be readily determined when the bar 14 is vibrating at its natural resonant frequency. The frequency of the alternating current will then be read from the meter 22.

After these observations have been made the thickness of the still wall can be readily determined through the following relations: let the length of the bar 14 be represented by $(a)$, the thickness of the wall to be measured by $(x)$, the frequency of the alternating current by $(n)$, the velocity of the sound waves in the metal bar by $(V)$ and the wave length of sound waves in the metal of which the bar is formed, by $(w)$. Then, the half wave length of sound in the bar which may be represented by $$\frac{w}{2}$$

will be equal to the length $(a)$ of the bar plus the thickness $(x)$ of the wall, or $$\frac{w}{2} = a + x \quad (1)$$

The wave length $(w)$ multiplied by the frequency $(n)$ shown by the meter 22 equals the velocity $(V)$ of sound in the metal of which the bar 14 is formed, and this velocity will be known or obtainable from suitable tables. Thus $$w \times n = V$$

and $$w = \frac{V}{n} \quad (2)$$

Therefore, through this relation the wave length is readily determined, and this value substituted in (1) leaves all factors of the equation determined except the thickness $(x)$ of the wall which can then be computed.

$$\frac{(V)}{\frac{n}{2}} = a + x$$

or $$x = \frac{V}{2n} - a \quad (3)$$

It will thus be seen that apparatus has been provided by means of which the thickness of a metal wall can be quickly and accurately determined. Although the bar 14 is shown as welded to the wall 10 it is of course obvious that the bar could be attached to the wall by means of a simple threaded connection, not shown. If threaded connections are provided, one bar 14 would of course be sufficient since this bar could be attached to the wall wherever the threaded connections were provided. If the bar is to be attached by welding, several of the bars 14 could be attached to the outside of the still wall at the places where corrosion is most likely to occur. In the latter instance each bar 14 may be provided with a coil 18 mounted permanently thereon or a single coil may be slipped over first one bar and then moved to another as the measurements are taken. Similarly, the microphone 24 and the short rod 26 may be permanently attached to one end of the bar 14 when it is desired to use one bar with threaded connections at various points on the wall 10. In case several bars 14 are permanently welded to the wall 10 the rod 26, which is securely affixed to the microphone 24, can be held manually against the projecting end of the bar 14 while the readings are being taken.

Obviously many modifications and variations of the invention, as hereinbefore set forth, may be made without departing from the spirit and scope thereof, and therefore only such limitations should be imposed as are indicated in the appended claims.

The invention described herein may be manufactured and used by or for the Government of the United States of America for governmental purposes without the payment of any royalties thereon or therefor.

I claim:

1. In a device for measuring the thickness of a metal wall, a member of magnetostrictive material secured substantially perpendicularly to a section of said wall the thickness of which is to be measured, means for setting up in said wall section and said member longitudinal waves in a direction perpendicular to the surface of said wall section, and means for varying the frequency of said waves so as to obtain the natural resonant frequency of the waves in said wall section and said member.

2. In a device for measuring the thickness of a metal wall, an elongated member of magnetostrictive material secured at one end substantially perpendicularly to said wall at a place at which the thickness is to be measured, a source of alternating current of variable frequency, a coil of wire connected to said source and surrounding said member, means for energizing said coil by said current at varying frequencies, and means for indicating when the natural resonant frequency of the waves in said wall and member is obtained.

HARVEY C. HAYES.